Oct. 24, 1961     D. A. KESINGER     3,005,551
CORN PITCHER

Filed Aug. 27, 1959     2 Sheets-Sheet 1

INVENTOR.
Donald A. Kesinger
BY
Paul O. Pippel
Atty.

United States Patent Office 3,005,551
Patented Oct. 24, 1961

3,005,551
CORN PITCHER
Donald A. Kesinger, Rock Island, Ill., assignor to International Harvester Company, Chicago, Ill., a corporation of New Jersey
Filed Aug. 27, 1959, Ser. No. 836,409
7 Claims. (Cl. 209—136)

This invention relates to a new and improved corn pitcher.

As a rule corn harvesting machines remove ears of corn from standing stalks and thereafter provide conveying means to deliver the harvested ear to a depositary. In small grain harvesters it is customary to have a grain receiving tank carried right on the harvesting machine whereas in ear corn it is customary to have a wagon trailing behind the harvesting machine and have elevator means on the corn picker harvester to elevate and deliver the harvested ears of corn rearwardly to the trailing wagon. It is contemplated in the present invention to generally eliminate the elongated elevator conveyors as they are presently used.

A principal object of this invention is to provide for the pitching of harvested ears of corn from a field traversing corn picker to a trailing wagon.

An important object of this invention is the provision of means in a corn pitcher for preliminarily increasing the velocity of travel of the ears of corn prior to their being thrown across the space between a corn picker and the receiving box of a trailing wagon.

Another important object of this invention is to supply a corn pitcher employing a tapered auger wherein the corn is delivered to the small diameter portion of the tapered auger and is discharged in a pitching manner from the large diameter end of the tapered auger.

Another and still further important object of this invention is to equip a tapered auger for a corn pitcher in which the auger flight has a constant helix angle along the outside of the tapered auger.

A still further important object of this invention is to provide a corn pitcher mechanism having its ends capable of receiving harvested ears of corn from a corn picker and provided with an auger tapering from small diameter ends to a large diameter central portion and including spiralled auger flight along the outer ends thereof and terminating in a paddle member at the enlarged central portion whereby the harvested corn delivered to the pitching mechanism has its velocity increased throughout the gradually increasing tapered auger ends for delivery to the pitching paddle member in the center thereof.

Another and still further important object of this invention is to include in the corn pitcher a straight through auger conveyor having oppositely disposed screw flights thereon and the auger being tapered from small diameter outer ends to a large diameter central portion and including transition curves from the ends of the auger flights and terminating in a paddle member at the large diameter central portion which is disposed parallel to the axis of rotation of the straight through auger conveyor.

Another and further important object of this invention is to supply a corn pitcher with an outwardly tapering auger conveyor toward both ends thereof and having a constant helix angle screw flight on the outside thereof throughout the end portions of the auger conveyor and terminating in a paddle member at the central portion thereof.

A still further important object of this invention is to provide a device capable of receiving harvested ears of corn from a corn picker and pitching those ears of corn into a trailing wagon with a handling of the ears of corn.

Another and still further important object of this invention is to provide for a two directional outwardly and downwardly tapering auger conveyor having diametrically opposed paddle members at an enlarged center portion thereof and each of said paddles forming end continuations of a spiral flight member on the outwardly and downwardly tapering end portions of the auger conveyor whereby ears of corn fed to the small diameter end portions of the auger are conveyed with a gradually increasing velocity to the central paddle members without jarring of the ears of corn or without the corn leaving the backing up thereof by the auger flight or the paddles until such time as the ears are pitched upwardly and rearwardly into a trailing wagon.

A still further important object of this invention is the provision of fan means concentrically disposed within a corn pitching mechanism to create a current of air for the removal of light trash material from the heavier harvested ears of corn.

Other and further important objects and advantages will become apparent from the disclosures in the following specification and accompanying drawings.

Figure 3:
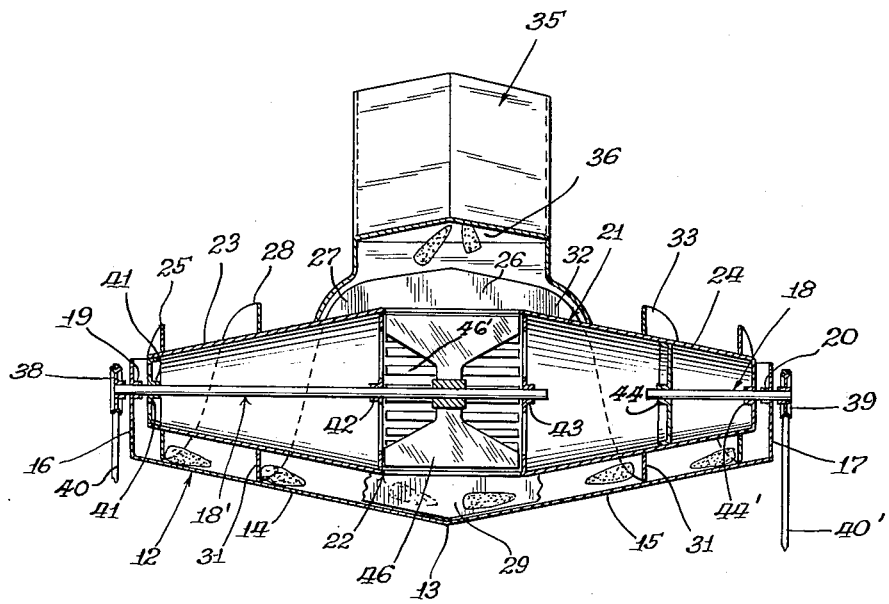
FIGURE 3 is a sectional view taken on the line 3—3 of FIGURE 1.

As shown in the drawings the reference numerals 10 and 11 indicate generally transversely spaced apart husking beds of a conventional corn picker. The husking beds as shown comprise a plurality of cooperative rolls disposed in a longitudinal direction and the husked ears of corn are discharged over the rear ends of the husking bed and into a receiving hopper 12. The hopper 12 projects across the width of the corn picker which has not been shown but which is the approximate width of the spaced husking beds 10 and 11. The top opening of the hopper 12 is rectangular in shape whereas the bottom of the hopper 12 as shown in FIGURE 3 has a lower central portion terminating in an apex 13 with upwardly and outwardly sloping bottom sections 14 and 15. These bottom sections 14 and 15 are joined at their ends with upwardly extending walls 16 and 17. It is in these walls 16 and 17 that aligned shafts 18 and 18' are journally mounted in spaced bearings 19 and 20 as best shown in FIGURE 3.

Figure 1:
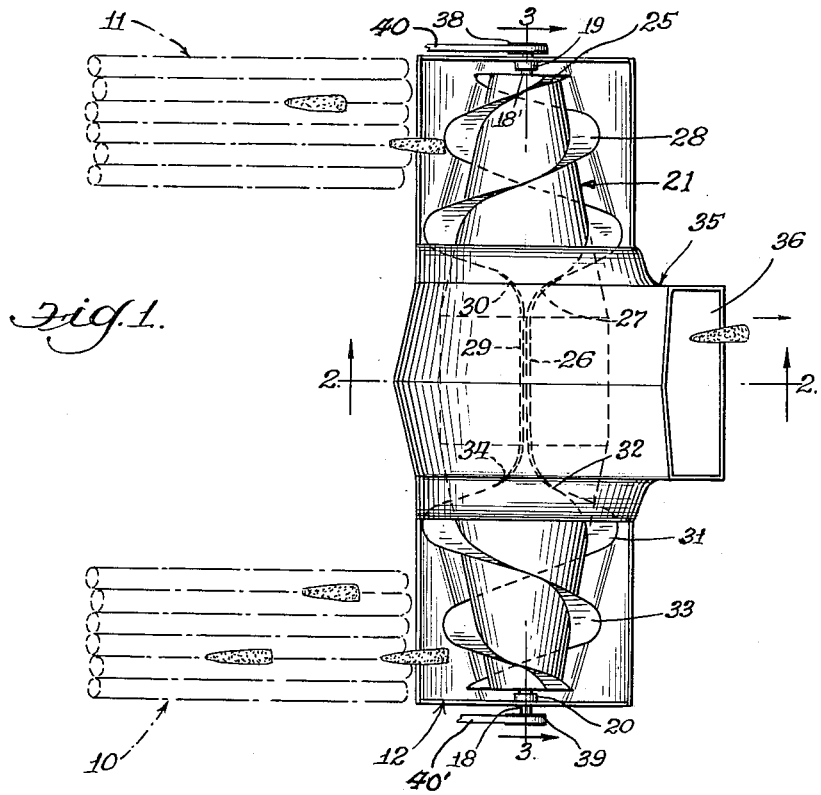
FIGURE 1 is a top plan view of the corn pitcher of this invention and showing in diagrammatic form the husking beds of an adjacent corn picker.

The shaft 18 carries an auger core member 21 which is provided with a generally cylindrical central section or portion 22 and downwardly and outwardly tapering end portions 23 and 24. The shaft 18' carries a fan 46 which is disposed concentrically within the central section 22 of the auger core 21. As shown in FIGURE 1 the small diameter outer end portion of the auger core are disposed rearwardly of and beneath the spaced apart husking beds 10 and 11 so that ears of corn harvested by the picker and husked by the husking beds drop vertically into the hopper 12 adjacent the small diameter ends of the auger conveyor 21.

Screw flight is provided on one end of the auger core 21 as shown at 25. The flight 25 blends into a central paddle member 26 by means of a smooth arcuate curve 27. On that same end of the auger conveyor there is provided a second screw flight member 28 which as shown in FIGURE 3 blends into a diametrically opposed paddle member 29 by means of a similar smooth easy flowing curve 30. Similarly on the other end of the tapered auger there is provided a screw flight member 31 which blends into the paddle 26 with a smooth arcuate curve 32 corresponding to the smooth arcuate curve 27 on the other end of the central paddle member 26. Also there is provided a second screw flight 33 interleaned between the screw flight 31 which as shown in FIGURE 3 terminates in a diametrically opposed paddle 29 and joined by a smooth arcuate curve 34 which corresponds to the smooth arcuate curve 30 on the other end of the paddle 29. All of the screw flights on the tapered auger have a constant helix angle leading to the diametrically opposed paddle members 26 and 29. The tapered auger projecting in opposite directions from a large diameter central portion outwardly and downwardly to small diameter end portions and having constant angle helix flight thereon causes ears of corn which are fed to the ends thereof to have their velocity constantly increased as the ears progress toward the center portion of the auger conveyor and by reason of the smooth curved connecting portions 27 and 32 for the paddle 26 and 30 and 34 for the paddle 29 there is a continuous feeding of ears of corn along the screw flights and into the diametrically opposed paddles 26 and 29 without any beating action on the ears of corn. In other words the flights and the paddles are constantly backing up the ears in a continuous flow of ears throughout the tapered auger. This means that there is no separation between the paddles 26 and 29 when the ears are thrown rearwardly and upwardly into a trailing wagon or the like. The ears are thus pitched with a minimum of damage caused thereto.

Figure 2:
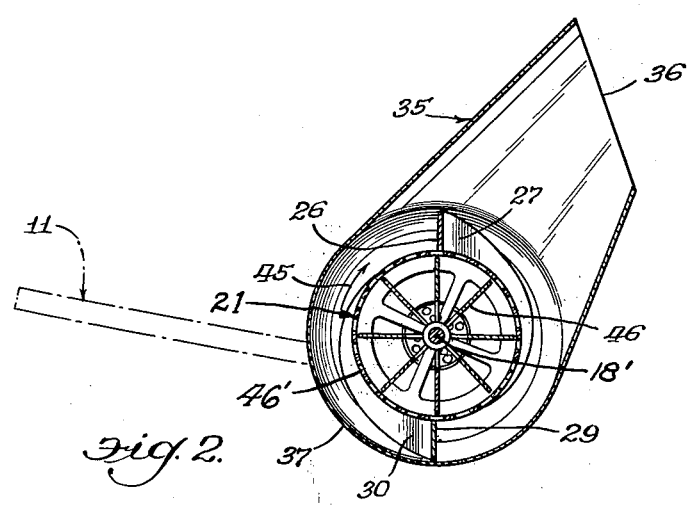
FIGURE 2 is a sectional view taken on the line 2—2 of FIGURE 1.

The central portion of the hopper 12 is provided with a discharge housing or passage 35 as best shown in FIGURES 1 and 2. This chute or guide member 35 projects upwardly and rearwardly to a discharge opening 36 at its rearward end. The lower forward end of the housing 35 extends down and around the hopper auger conveyor 21 as shown in FIGURE 2 at 37. The paddle members 26 and 29 disposed in the center of the auger conveyor 21 cause ears of corn to be thrown through the guide housing 35 and out the discharge opening 36 through an arched trajectory for deposit in a wagon box.

The ends of the shafts 18 and 18' are equipped with V-pulleys 38 and 39 whereby drive by means of V-belts or the like 40 and 40' such as shown in FIGURE 2 may impart rotational drive to the internally disposed fan 46 and to the auger conveyor 21. The shaft 18' is journally mounted in supporting brackets 41, 42 and mounted internally of and on supporting ribs of core 21. The shaft 18 is fixedly carried in brackets 44 and 44' in supporting ribs of the auger core 21 to thereupon impart rotation of the shaft 18 to the auger core. Thus rotation of the V-pulleys 38 and 39 imparts rotation to the outwardly tapering auger conveyor 21 and to the fan 46. This causes ears of corn fed to the ends of the hopper 12 adjacent the small diameter portions of the auger to be fed centrally by the oppositely disposed screw flights thereon with a gradually increasing speed because of the constant angle of the screw flight as the screw flight leads to the diametrically opposed central paddle members 26 and 29 and causes the fan 46 to discharge air through slotted openings 46' in the circumferential wall of the center section 22 of the auger core 21. Each end of the auger 23 and 24 which tapers downwardly and outwardly is provided with a dual screw flight, each of which feeds to one of the centrally disposed paddle members 26 and 29.

In the operation of the device of this invention corn is fed inwardly toward the center of the auger 21 and toward the center of the hopper 12 toward its bottom apex 13. The ears are caused to turn through an arcuate path by means of the smooth blending curves 27 and 32 on the paddle 26, and 30 and 34 on the paddle 29. It should be noted that the paddles 26 and 29 are both tapered outwardly from their centers to correspond to the shape of the bottom of the hopper 12 with its apex 13 and upwardly and outwardly tapering bottom sections 14 and 15. Thus the bottom of the hopper is wiped clean by the paddles each time as the paddles rotate therethrough. It is thus evident that as the ears of corn fall into the open top hopper 12 the tapering auger will feed the ears of corn at a gradually increasing rate of speed to the center of the hopper which is confined by the enclosure 35. As the ears of corn are moved into the auger center portion against the paddle members 26 and 29 the auger member, rotating in the direction of the arrow 45 as shown in FIGURE 2, throws the ears outwardly through the short stubby housing extension 35 and out the discharge opening 36 for travel through the air and into a trailing wagon which is pulled by the corn picker on which the ear pitching mechanism is mounted. The fan 46 which is preferably driven at a considerably faster speed than the auger 21 causes a current of air to pass outwardly through the slots 46' whereby light trash material is discharged through the same housing extension 35 through which the harvested ears pass. However, the trajectory of the light trash is such that it avoids deposit in the receiving wagon or the like and is merely deposited on the ground. Clean corn is thus delivered to the trailing wagon and it is substantially free of light trash material.

I am aware that herein is provided a means for conveying ear corn from a corn picker with a minimum of damage to a trailing wagon and without the necessity of employing a large elongated elevator enclosure which previously was used to span the gap between the corn picker and a trailing wagon. Various details of construction may be varied throughout a wide range without departing from the principles disclosed herein and I therefore, do not propose limiting the patent granted hereon otherwise than as necessitated by the appended claims.

What is claimed is:

1. An ear corn pitcher for corn harvesters comprising a hopper, an auger conveyor core rotatably driven within said hopper, paddle members formed on said auger conveyor core at its central portion, said auger conveyor core having outwardly tapering end portions, screw flight mounted on said auger conveyor core end portions and joined with said paddle members in the center thereof, a discharge housing adjoining said hopper around said paddle members and projecting upwardly and rearwardly and having a discharge opening at the upper rearward end thereof, whereby the paddle members pitch ears of corn from the hopper upwardly and rearwardly through the discharge opening of said discharge housing.

2. A device as set forth in claim 1 in which the screw flight and paddle members are joined with smooth flowing curved members to facilitate the passage of ears of corn between the screw flight and the paddles without damaging the ears of corn.

3. A device as set forth in claim 1 in which the screw flight on the auger conveyor has a constant helix angle.

4. A device as set forth in claim 3 in which the hopper has a downwardly and centrally tapering bottom and the paddles on the auger conveyor are similarly shaped to conform closely to the hopper bottom whereby all material in the center portion of the hopper is discharged by the paddle members passing through the hopper bottom.

5. A device as set forth in claim 3 in which there is included a short upwardly and rearwardly inclined enclosure housing with a discharge opening at the upper rearward end thereof to guide corn material upwardly and rearwardly for deposit in a trailing wagon or the like.

6. A device as set forth in claim 1 in which a cleaning fan is disposed within said auger conveyor core and is rotatably mounted with respect to said auger, said central portion of said auger conveyor core being perforated, whereby air from the fan passes outwardly through said perforated central portion to cause the discharge of light trash from the harvested corn.

7. A device as set forth in claim 5 in which the central section of the auger conveyor core has surface openings to the interior thereof, a cleaning fan journally mounted within the central section of said auger conveyor core, means of rotating said cleaning fan separately from said auger conveyor whereby the fan blows through said surface openings to remove light trash material from the harvested corn.

References Cited in the file of this patent

UNITED STATES PATENTS

| | | |
|---|---|---|
| 2,155,423 | Korsmo | Apr. 25, 1939 |
| 2,663,405 | Messing | Dec. 22, 1953 |
| 2,792,098 | Teske | May 14, 1957 |
| 2,935,193 | Karlsson | May 3, 1960 |